(12) United States Patent  (10) Patent No.: US 7,117,628 B1
Bailey (45) Date of Patent: Oct. 10, 2006

(54) SELF-RIGHTING WATERFOWL DECOY WITH INTEGRATED ANCHOR AND LOCKING MECHANISM

(75) Inventor: Russell D. Bailey, P.O. Box 203, Vienna, IL (US) 62995

(73) Assignee: Russell D. Bailey, Vienna, IL (US)

( * ) Notice: Subject to any disclaimer, the term of this patent is extended or adjusted under 35 U.S.C. 154(b) by 0 days.

(21) Appl. No.: 10/763,924

(22) Filed: Jan. 23, 2004

(51) Int. Cl.
*A01M 31/06* (2006.01)
(52) U.S. Cl. .............................. 43/3; 242/284
(58) Field of Classification Search ............... 43/2, 43/3; 242/283, 284
See application file for complete search history.

(56) References Cited

U.S. PATENT DOCUMENTS

| | | | |
|---|---|---|---|
| 811,036 A * | 1/1906 | Cram | 43/3 |
| 814,097 A * | 3/1906 | Tartsch | 43/3 |
| 1,417,441 A * | 5/1922 | Adams | 43/3 |
| 1,789,649 A | 1/1931 | Gazecki et al. | |
| 1,951,429 A | 3/1934 | Massie | |
| 2,589,913 A | 3/1952 | Wenner | |
| 2,747,814 A * | 5/1956 | Taylor | 242/379.2 |
| 2,917,857 A | 12/1959 | Muszynksi | |
| 3,059,368 A * | 10/1962 | Wortman | 43/3 |
| 3,079,719 A | 3/1963 | Muszynski | |
| 4,340,192 A | 7/1982 | Burris, III | |
| 4,674,219 A | 6/1987 | Chargo et al. | |
| 4,757,630 A * | 7/1988 | Torberg | 43/3 |
| 4,826,099 A | 5/1989 | Johnson | |
| 4,827,653 A * | 5/1989 | Sewell | 43/3 |
| 5,367,813 A * | 11/1994 | Cherry | 43/2 |
| 5,893,230 A | 4/1999 | Koltoniak | |
| 5,941,008 A | 8/1999 | Schmidt et al. | |
| 5,992,078 A | 11/1999 | Willis | |
| 6,374,529 B1 | 4/2002 | Petroski et al. | |
| 6,487,811 B1 | 12/2002 | Barrett | |
| 6,648,257 B1 * | 11/2003 | Lu | 242/284 |
| 2002/0157299 A1 * | 10/2002 | Barrett | 43/3 |

* cited by examiner

*Primary Examiner*—Kurt Rowan
(74) *Attorney, Agent, or Firm*—Harness, Dickey & Pierce P.L.C.

(57) ABSTRACT

The present invention relates to waterfowl decoys. More particularly, the present invention relates to waterfowl decoys with a weighted reel allowing the decoy to automatically self-right upon deployment, an integrated cranking means that allows a hunter to quickly and easily secure an anchor line, and a partially counter-sunk anchor weight.

10 Claims, 9 Drawing Sheets

SELF-RIGHTING WATERFOWL DECOY WITH INTEGRATED ANCHOR AND LOCKING MECHANISM

FIELD OF THE INVENTION

The present invention relates to waterfowl decoys. More particularly, the present invention relates to waterfowl decoys with a weighted reel, an integrated cranking means to secure an anchor line, and a counter-sunk anchor weight.

BACKGROUND OF THE INVENTION

The floating waterfowl decoy has long been used by hunters to attract waterfowl. The use of decoys is imperative to a successful hunt, especially early in the season. Hunters have, however, long experienced problems using decoys; such as deployment, retrieval, and maintaining the decoys in a desired position while deployed in addition to storage and transportation difficulties. A typical hunter may deploy a decoy only to have the decoy tilt once deployed and fail to self-right. Various ballast means attached to the exterior have been employed in prior art decoys. Typically, however, such ballast protrudes from the decoy thereby frustrating both storage and transportation. Decoys are maintained in position by using anchors, attached to decoys by flexible anchor lines. Decoys in the prior art have required hunters to wrap anchor lines around decoys, often leading to entanglement, both upon deployment and upon retrieval. Prior art anchors often protrude from decoys, even when anchor lines are brought in and the anchor stowed, frustrating both storage and transportation similar to ballast and potentially marring or marking the finish on other decoys during storage and transportation. Prior art anchor lines are often of improper length and result in decoys not holding a desired pattern on the water surface. Later improvements employ various means of taking in anchor lines but many involve springs, metal components or other mechanisms subject to rust and corrosion that renders the decoys useless. Other prior art decoys require hunters to engage in the use of additional tools or implements to reel in or put out anchor line thus requiring the hunter to keep track of yet more equipment and hardware. Deployment and retrieval is made even more difficult by the fact that hunters often engage in this activity in pre-dawn or low light levels, regularly in cold and wet weather conditions.

Various attempts have been made to improve the waterfowl decoy. U.S. Pat. No. 1,789,649 employs a detent and gear to prevent an internal reel from rotating and playing out line after it has been set, and uses an enlarged nib and spring clip to hold the anchor. U.S. Pat. No. 1,951,424 uses a reel attached to a plate and anchor control mechanisms carried by the plate in one end of a chamber located in a decoy. U.S. Pat. No. 4,340,192 discloses a reel hung inside the body of a decoy, with a ratchet-like locking system of notches to engage a locking pin, which also serves as the release lever and line guide. U.S. Pat. No. 4,757,630 discloses a decoy anchoring mechanism with a detachable reel and weighted handle that is mounted vertically under the keel of a decoy using a pivoting cam and clamp assembly. U.S. Pat. No. 4,827,653 employs the use of a hollow keeled-decoy wherein an anchor reel mechanism is enclosed in the hollow keel, the anchor being retrieved by inserting a crank in one end of the reel and cranking to wind the anchor line on a spool, the anchor line being secured by a threaded plug inserted in the anchor housing. U.S. Pat. No. 6,487,811 and U.S. Pat. Appl. No. 2002/0157299 disclose a waterfowl decoy with a self-retracting anchor line characterized by a spring-actuated anchor line reel, the anchor trained through an opening in the breast section of the decoy, the anchor being secured by a lock member located in the breast opening.

SUMMARY OF THE INVENTION

The present invention provides an improved waterfowl decoy. More particularly, in the preferred embodiment of this invention, a waterfowl decoy is provided that has a weighted reel which will function to cause the decoy to automatically self-right when deployed thus eliminating both the tendency of a decoy to tilt or upend and eliminates the presence of a weighted keel that protrudes from the body of a decoy. The weighted reel can also function to resist anchor cord from playing out and allowing the decoys to move from the pattern in which they are placed. The weighted reel also facilitates the retrieving and securing an anchor line.

Generally, the waterfowl decoy according to the preferred embodiment of this invention comprises a buoyant body portion simulating a waterfowl; a reel; an anchor line attached to the reel; an anchor attached to the anchor line; and an integrated cranking means to secure the anchor line. The integrated cranking means provides means of winding and unwinding anchor line and the attached anchor and when not in use, may be folded or stowed in an integrated manner within a recess located in the buoyant body. This arrangement provides a convenient means to let out and retrieve anchor line without the use of additional tools or hardware.

According to a further feature of the preferred embodiment of this invention, through stowage of the integrated cranking means the anchor is secured. When the cranking means is unfolded the anchor, by means of gravity, deploys line. Once the anchor has settled on the bed of the associated body of water in which the decoy is located, the cranking means is then folded and stowed. The cranking means comprising a handle having at least one jointed connection; rotatably connected to a reel mounted in the buoyant body; and means for the cranking means to effect rotation of the reel. This arrangement allows the anchor line of the decoy to be quickly and easily secured without the use of additional tools or hardware and eliminates springs or other metal components subject to rust and corrosion.

According to a further feature of the preferred embodiment of this invention, the buoyant body contains a recess and opening through which the anchor line is trained; the recess of shape and dimension to partially or wholly receive the anchor.

According to a further feature of the preferred embodiment of this invention, the reel contains one or more holes that, when exposed outside the buoyant body, provide means by which to attach multiple decoys together through the use of string, rope or cable.

According to yet a further feature of the invention, the reel is partially disposed within the buoyant body and partially exposed outside the buoyant body. Such arrangement allows for the weighted portion of the reel, when left to swing outside the buoyant body, to be appropriated colored to resemble the feet of a waterfowl.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 11A is a partial left side elevation view of the crank mechanism; FIG. 11B is a partial right side elevation view of the crank mechanism.

Corresponding reference numerals indicate corresponding parts throughout the several views of the drawings; and FIG. 11C is a partial plan view of the set screw.

DETAILED DESCRIPTION OF THE PREFERRED EMBODIMENTS

Figure 1:
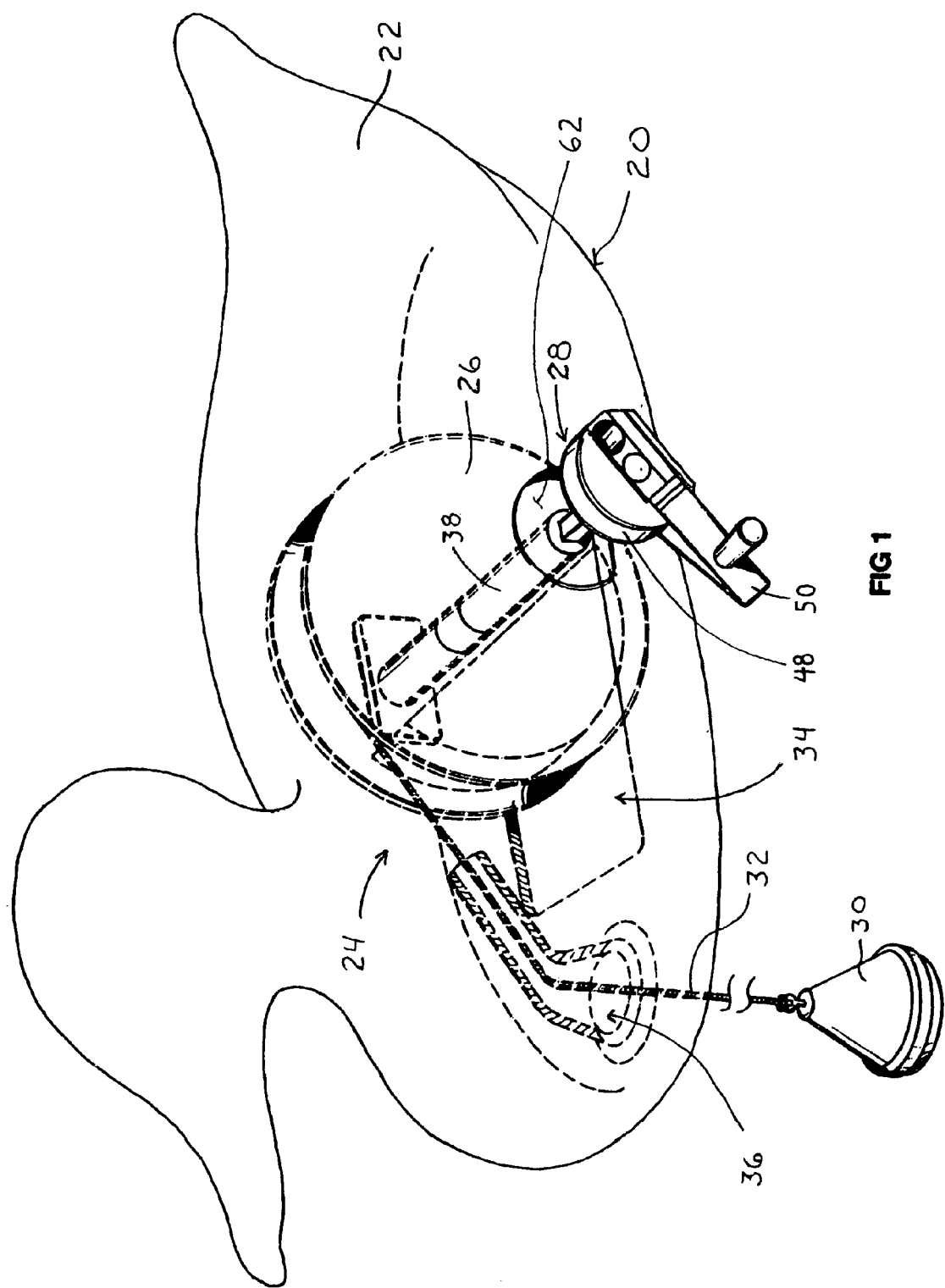
FIG. 1 is a perspective view of a preferred embodiment of a waterfowl decoy constructed in accordance with the principles of this invention, with portions broken away to reveal details of construction.

The following description of the preferred embodiment(s) is merely exemplary in nature and is in no way intended to limit the invention, its application, or uses. In the description, like parts are marked throughout the specification and drawing with the same reference numerals, respectively. The drawing figures are not necessarily to scale in the interest of clarity and conciseness.

Referring to FIG. 1, a preferred embodiment of a waterfowl decoy in accordance with the invention is indicated generally as 20. The decoy 20 includes a buoyant body 22 configured to resemble a particular waterfowl of interest. The waterfowl decoy 20 is characterized as a migratory waterfowl, such as a duck. However, other types of waterfowl decoys, such as those for geese, may benefit from the improvements provided by the invention. The decoy is preferably shaped and painted to realistically represent the selected waterfowl.

The decoy 20 further comprises an anchor mechanism 24 comprising a weighted reel 26; a crank mechanism 28 for operating the reel, an anchor 30, and an anchor chord 32 extending from the reel to the anchor. The anchor mechanism 24 is at least partially disposed in a recess 34 in the body 22. A separate recess 36 is provided for receiving the anchor 30 when it is in its retracted position.

Figure 4:
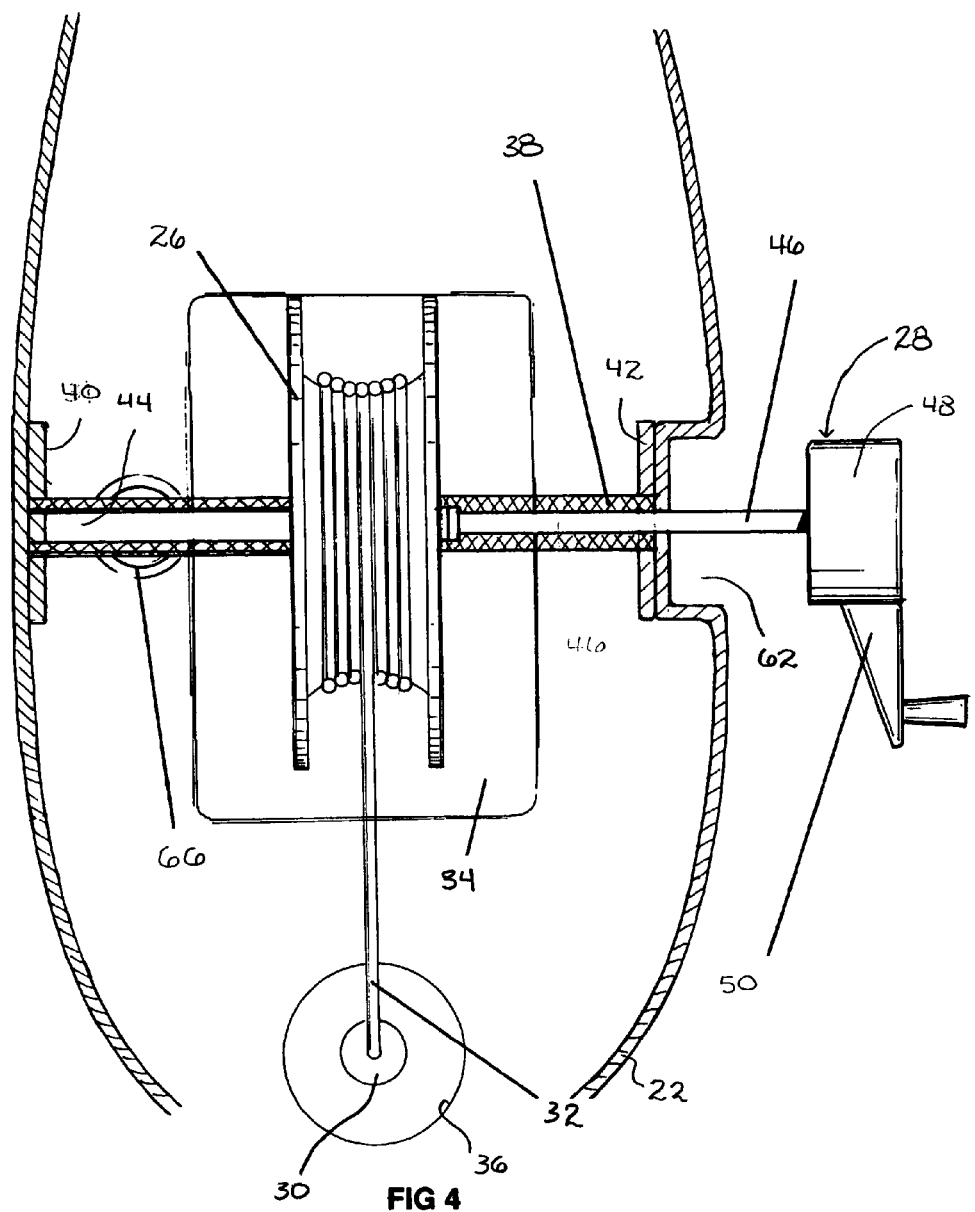
FIG. 4 is a partial horizontal cross sectional view of the decoy, showing the reel and crank mechanism for the anchor.
Figure 5:
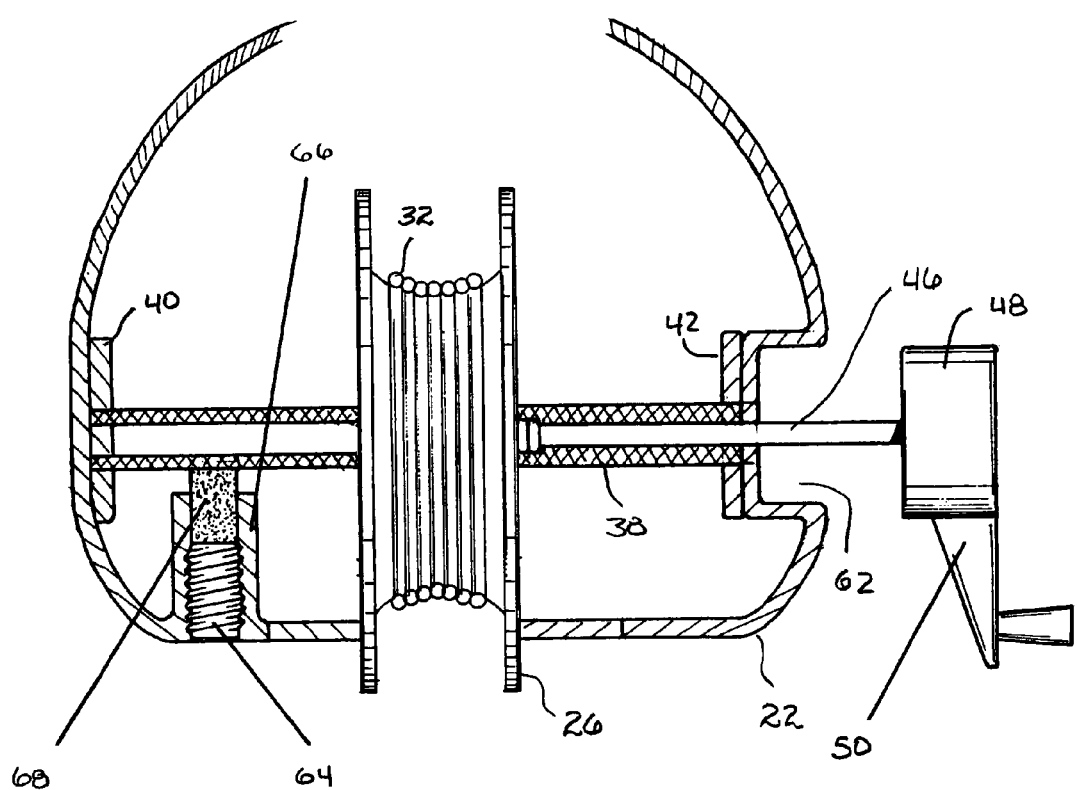
FIG. 5 is a partial transverse vertical cross sectional view of the decoy, showing the reel and crank mechanism.

The crank mechanism 28 comprises a shaft 38 rotatably mounted in the recess 34 in the body 22, between two plates 40 and 42 secured to the body 22 (e.g. molded in) (see FIG. 4). The shaft 38 has bore 44 therethrough having a square cross-section. An extension 46, having a corresponding square cross section, is telescoping disposed in the bore 44. A crank body 48 is mounted on the end of the extension 46. A handle 50 is hingedly mounted on the crank body 44, for swinging movement between an deployed position and a stowed position.

Figure 10:
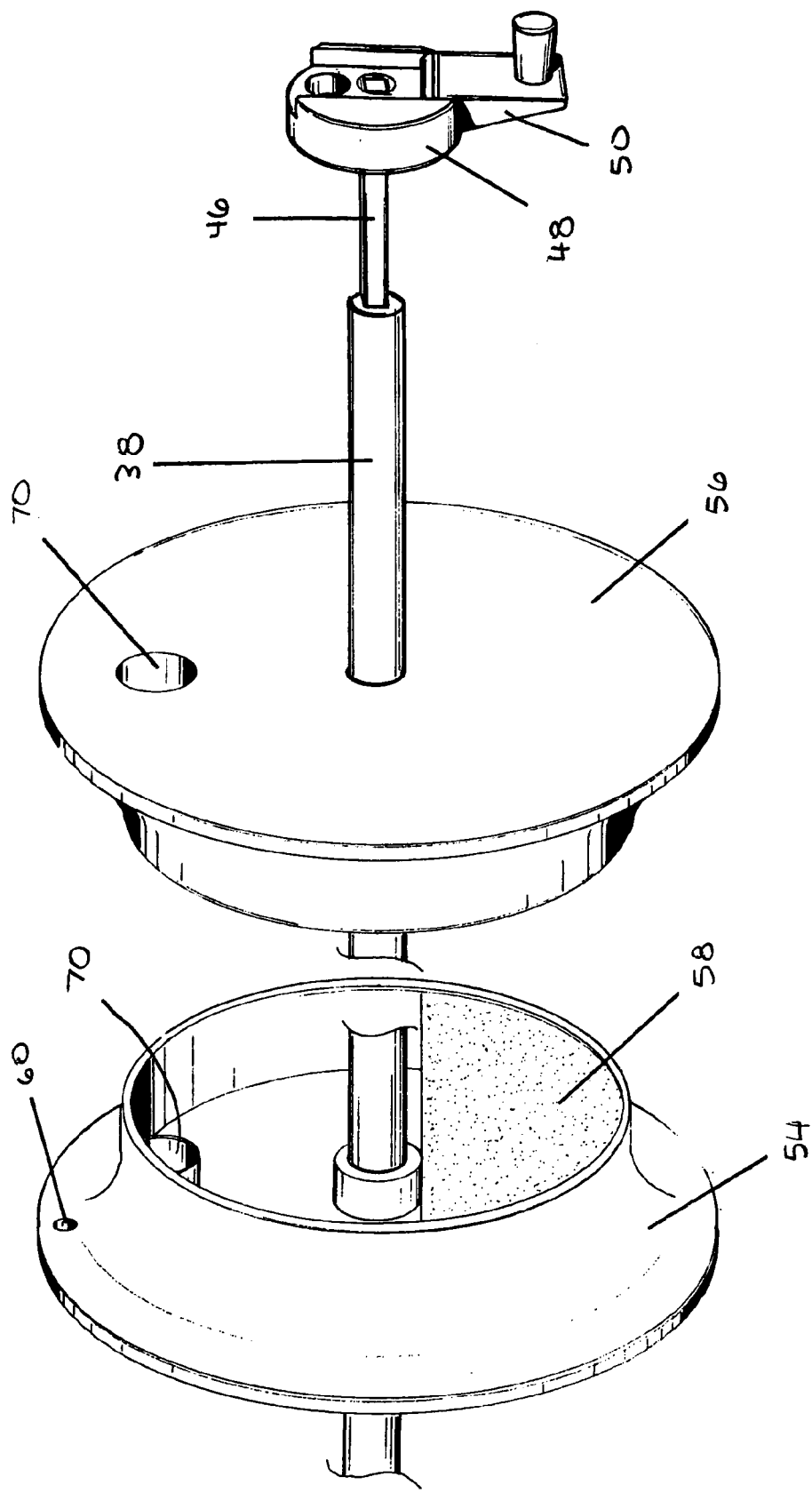
FIG. 10 is an exploded perspective view of the reel on the crank mechanism.
Figure 11:
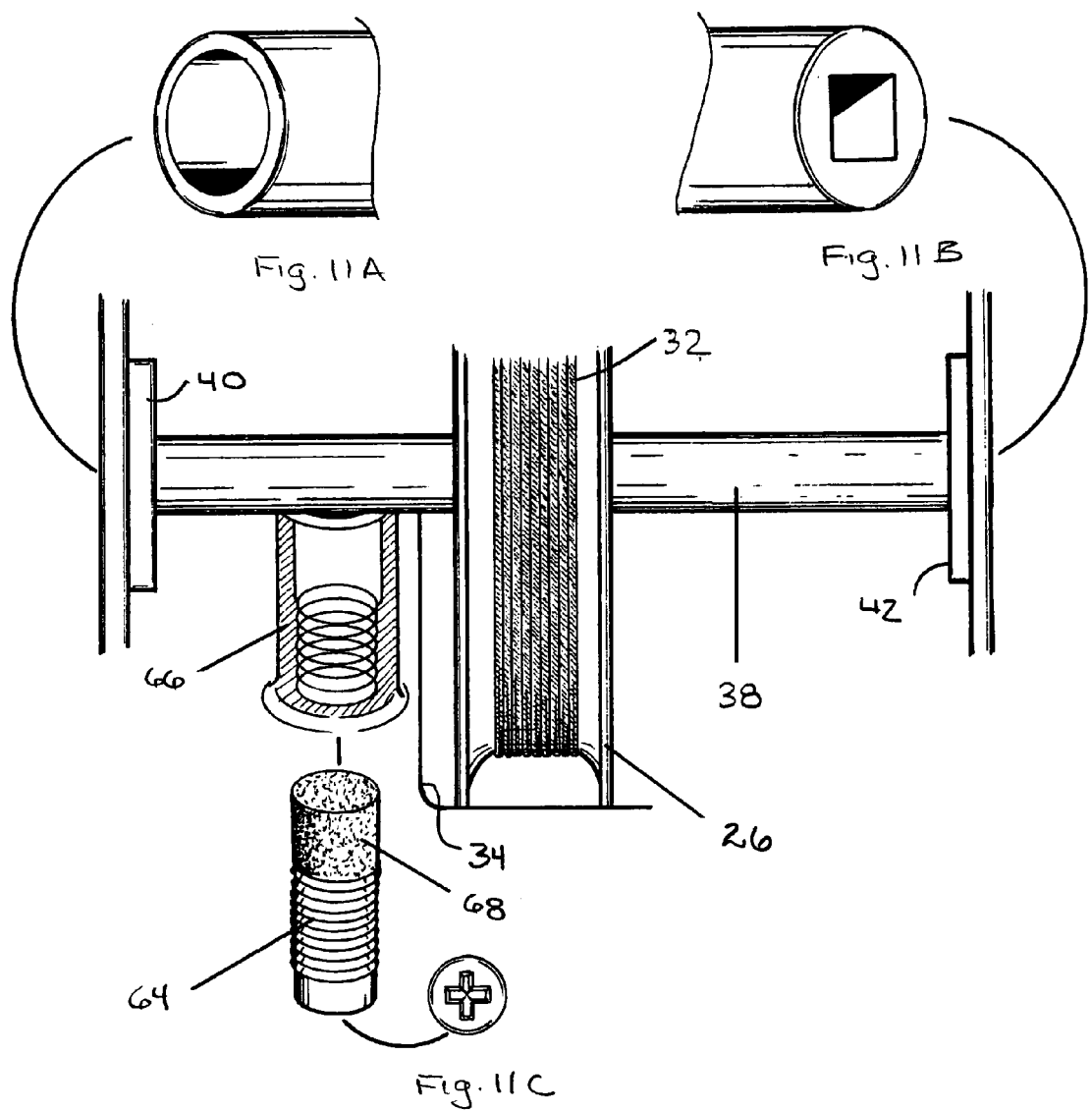
FIG. 11 is a top plan view of the reel and crank mechanism.

The weighted reel 26 comprises first and second halves 54 and 56 mounted on the shaft 38 (see FIG. 10). A semi-circular weight 58 is disposed between the halves 54 and 56, which eccentrically weights the reel 26. There is a hole 60 in half 54 for securing the anchor cord 32.

Figure 2:
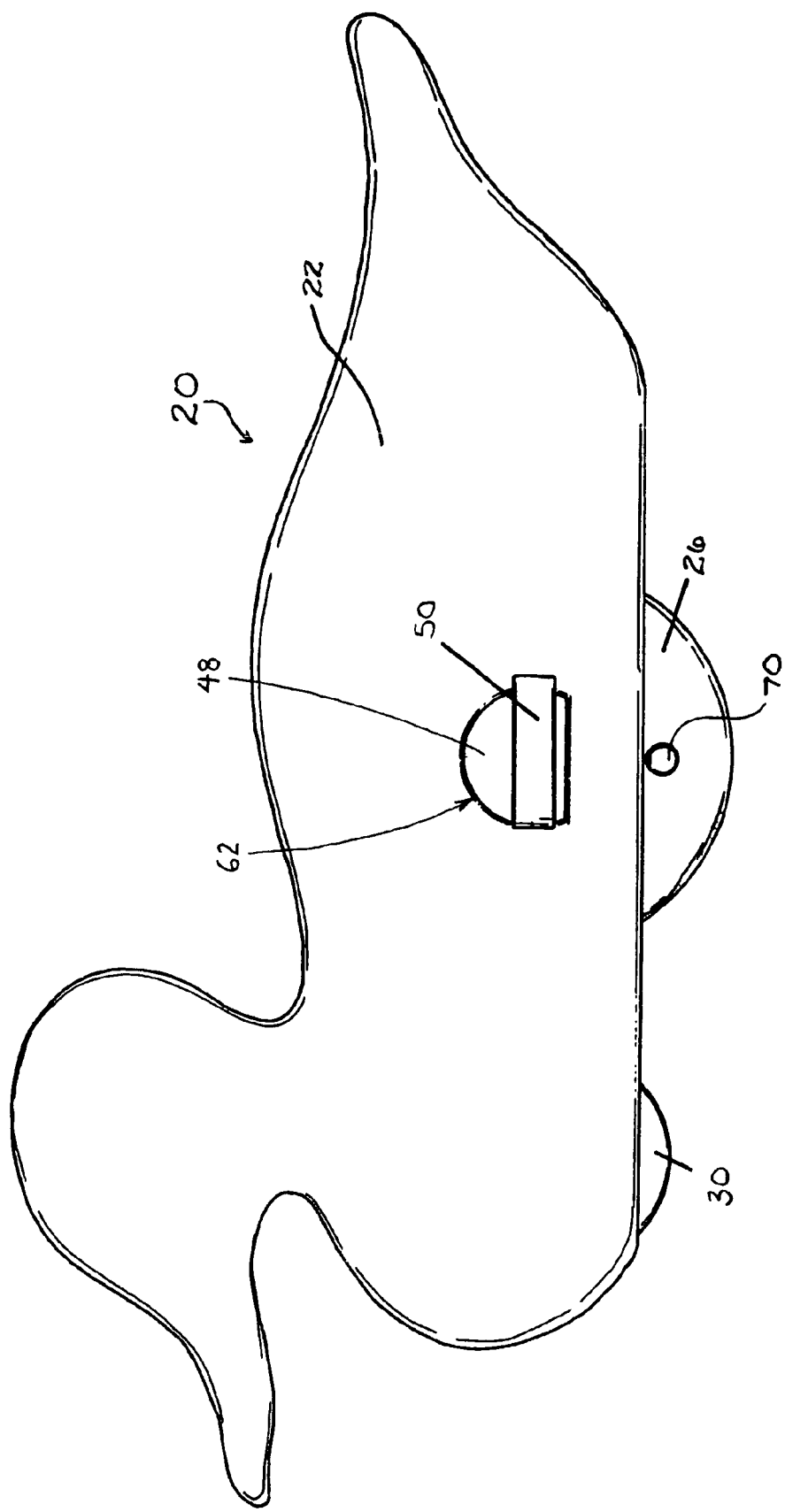
FIG. 2 is a side elevation view of the waterfowl decoy.
Figure 3:
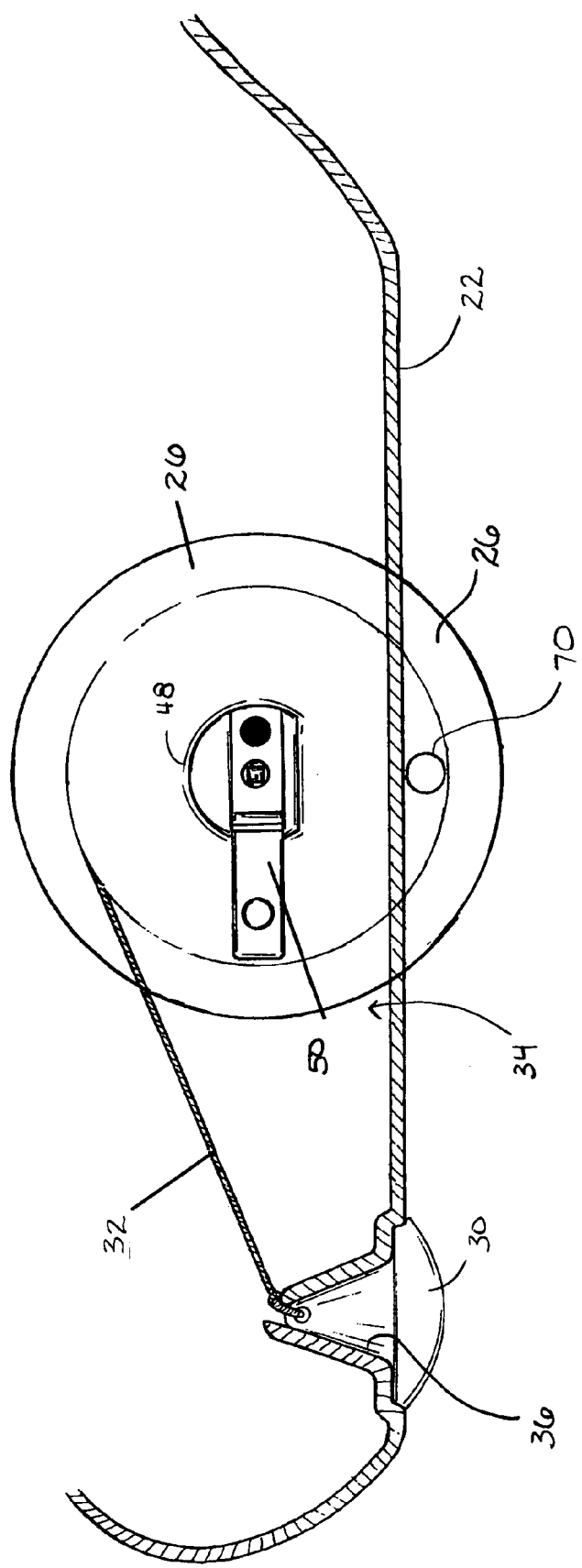
FIG. 3 is a partial longitudinal cross sectional view of the reel and crank mechanism for the anchor.
Figure 6:
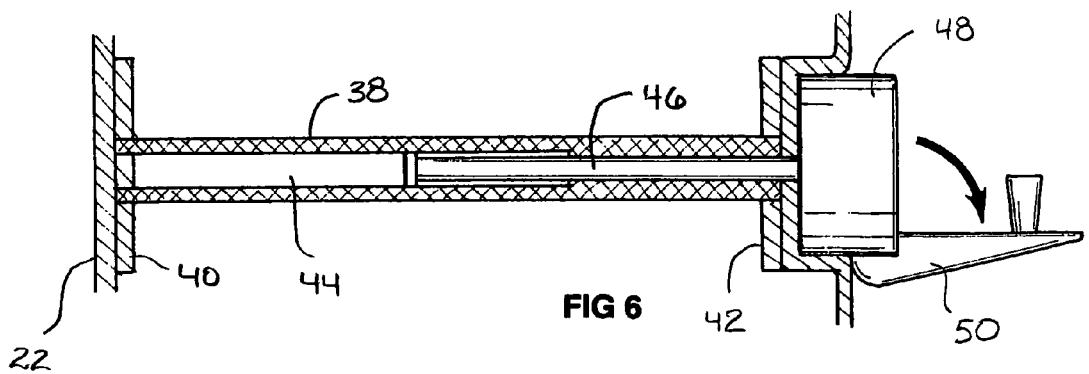
FIG. 6 is partial cross-sectional view of the crank mechanism with the reel removed, showing the crank mechanism in its retracted stowed position.
Figure 7:
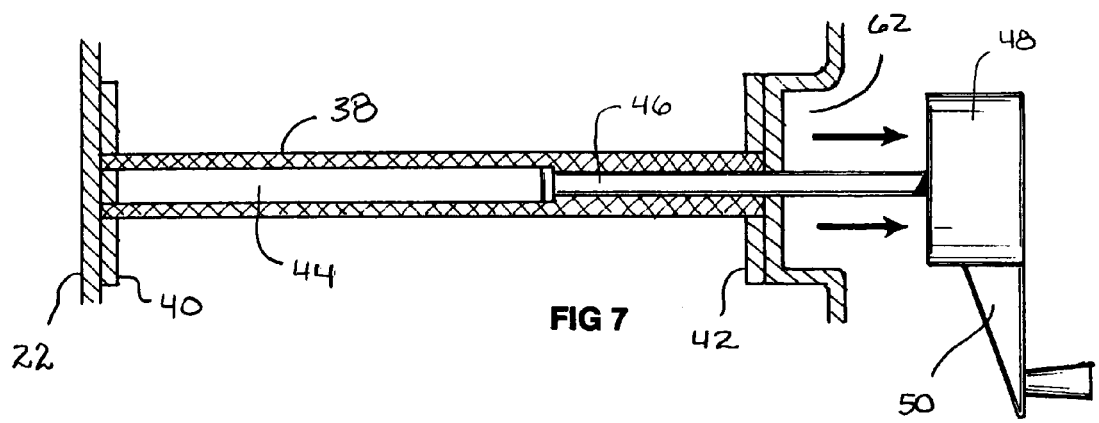
FIG. 7 is a partial cross-sectional view of the crank mechanism with the reel removed, showing the crank mechanism in its extended operational position.
Figure 8:
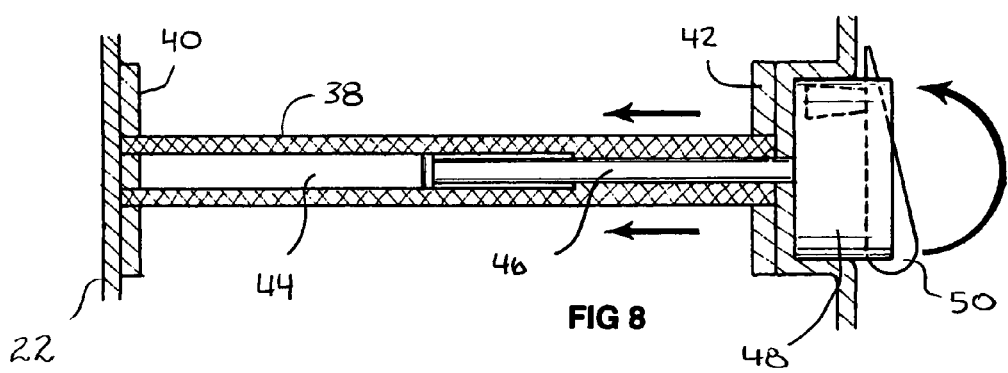
FIG. 8 is a partial cross-sectional view of the crank mechanism with the reel removed, showing the crank mechanism in its retraced stowed position.
Figure 9:
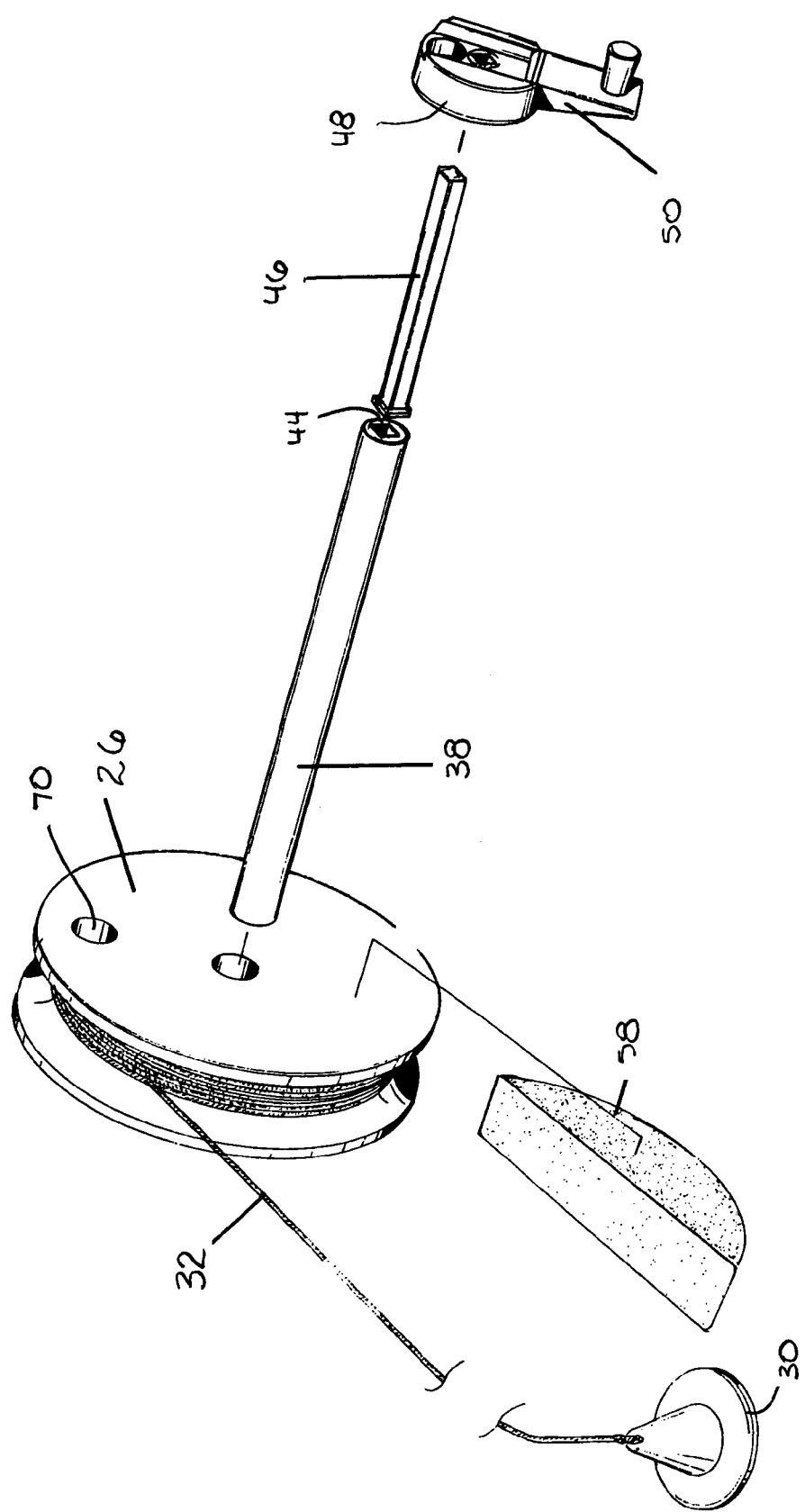
FIG. 9 is an exploded perspective view of the reel and crank mechanism.

As shown in FIG. 6, the handle 50 is swung from the body 48, which is disposed in a recess 62 in the body 22. As shown in FIG. 7, the body 48 can be pulled from the D-shaped recess 62 (shown in FIGS. 1 and 2) and the handle can be operated to turn the extension 46, which turns the shaft 38, which in turn winds or unwinds the anchor cord 32 on the reel 26. When the reel 26 is in the desired position, the handle 50 can be folded back into the body 48, and the body can be pushed back into the recess 62.

The reel 26 is preferably eccentrically weighted by the weight 58. This eccentric weighting helps maintain the reel 26 in its desired position, resisting further winding or unwinding of the anchor cord 32. Further winding or unwinding of the cord lifts the weight 58, thereby resisting (but not preventing) turning of the reel 26. The crank body 48 can also engage the recess 62 to further resist turning of the reel 26. A set screw 64 can also be provided in a threaded socket 66 to urge a resilient member 68 to engage the shaft 38 and resist turning. The weight 58 also projects below the bottom of the body 22, to self-right the decoy 20, and resist tipping.

Operation

In operation the anchor 30 is either pulled from the recess 36, or the crank mechanism 28 can be used to unwind the cord to release the anchor. When the cord 32 is at the desired length, the decoy 20 can be thrown into the water. The eccentric weighting of the reel 26 preferably allows the anchor 30 to unwind additional cord 32 until the anchor hits bottom. Thereafter, the eccentric weight 58 is sufficient to resist rotation of the reel 26, keeping the cord 32 at the proper length. Because in the preferred embodiment the weight 58 projects from the bottom of the decoy 20, it tends to right the decoy, and to resist further tipping.

After the hunt, the decoys can be collected and the cord quickly and easily wound by unfolding the handle and pulling the crank body 48 out of the recess 62 to turn the crank to turn extension 46 to turn the shaft 38, and thus the reel 26. The cord 32 is wound until the anchor 30 is seated in the recess 36. A detent could be provided to help hold the anchor 30 in the recess 36. A passage 70 through the reel 26 allows multiple decoys to be collected on the same tether, which also has the advantage of stopping rotation of the reel 26, and deployment of the anchors 30.

The foregoing description of the invention is merely exemplary in nature and, thus, variations that do not depart from the substance of the invention are intended to be within the scope of the invention. Such variations are not to be regarded as a departure from the spirit and scope of the invention.

What is claimed is:

1. A waterfowl decoy comprising:
a buoyant body having a first recess therein;
a reel rotatably mounted within at least a portion of the first recess in the buoyant body, the reel having first and second halves and an eccentric weight disposed between the first and second halves of the reel such that the reel is eccentrically weighted so at to resist but not prevent rotation of the reel within the first recess in said buoyant body;
a flexible anchor line attached to the rotatably mounted reel;
an anchor attached to the anchor line, the anchor being of sufficient weight to cause the reel to rotate and the line to unwind until the anchor hits bottom; and
an integral cranking means in connection with the reel, the cranking means being configured to rewind the anchor line and to be pushed into a stowed position within a D-shaped second recess in the buoyant body to resist rotation of the reel to secure the anchor,
wherein the eccentric weight is of sufficient weight to resist rotation of the reel and unwinding of the line after the anchor hits lake bottom.

2. The waterfowl decoy of claim 1, wherein the eccentrically weighted reel is unevenly weighted to provide resistance to rotation of the reel, and the anchor is of sufficient weight to overcome the resistance and rotate the reel to unwind the line until the anchor hits bottom.

3. The waterfowl decoy of claim 1, wherein the anchor causes rotation of the reel by means of gravity, and the eccentric weight resists further rotation after the anchor hits bottom to resist further unwinding of the anchor line.

4. The waterfowl of claim 3, wherein the eccentrically weighted reel functions as a weighted keel to cause the waterfowl to self-right.

5. The waterfowl of claim 1, wherein the anchor is of sufficient weight to cause the reel to rotate by means of gravity to unwind the anchor line when the water fowl is being deployed in a body of water, and the eccentric weight is sufficient to resist rotation of the reel and unwinding of the anchor line after the anchor hits bottom, and the cranking means is configured to be stowed in a manner that resists rotation of the reel to secure the anchor when the water fowl has been retrieved from a body of water.

6. The waterfowl of claim 1 wherein the reel is mounted to a shaft received in the first recess in the buoyant body.

7. The waterfowl of claim 1 wherein the reel mounted in the first recess is partially disposed within the first recess in the buoyant body and partially disposed outside the first recess.

8. The waterfowl of claim 1 wherein the anchor line is trained through an opening in the buoyant body.

9. The waterfowl of claim 1 wherein the buoyant body receives a tapered portion of the anchor such that the anchor is partially disposed within the buoyant body.

10. The waterfowl of claim 1 wherein the reel contains one or more holes located in an outer hub of the reel.

* * * * *